United States Patent Office 3,067,042
Patented Dec. 4, 1962

3,067,042
PROCESS FOR PREPARING POTATO FLAKES
Morton Pader, West Englewood, N.J., assignor to Lever Brothers Company, New York, N.Y., a corporation of Maine
No Drawing. Filed July 17, 1959, Ser. No. 827,718
10 Claims. (Cl. 99—207)

This invention relates to a process of preparing dehydrated potatoes. More particularly, the invention relates to a process of preparing high quality dehydrated mashed potato flakes of high bulk density from low solids potatoes, i.e., from potatoes containing less than 20% total solids in their raw state.

Dehydrated mashed potatoes have a number of advantages over fresh potatoes, the most important of which are improved keeping qualities and greater ease of handling. Notwithstanding these advantages, dehydrated potatoes have enjoyed only a limited measure of commercial success, mostly because the quality of the reconstituted potatoes is not equal to that of the freshly-prepared product. At the present time, at least three distinct types of dehydrated mashed potatoes have been developed. These types are generally termed potato granules, potato flakes, and porous extruded cylinders.

Much interest has recently been shown in a drum-drying process such as that described in United States Patents Nos. 2,759,832, 2,780,552 and 2,787,553. The process described in these patents provides a dehydrated potato which reconstitutes to a mashed potato of good quality. While the quality of the potato produced according to the processes set forth in these patents is acceptable, a number of disadvantages are encountered.

One important disadvantage is the low bulk density of the flakes obtained by drum-drying the mashed potato according to the processes of these patents. To illustrate, the prior art potato granules have a high density, generally in the range of 50 lbs. per cubic foot. This high density is advantageous from a packaging point of view, but the process for preparing the granules requires critical control. The mash obtained on reconstituting granules is generally not quite so close to fresh mashed potatoes in texture as mash reconstituted from flakes, and potatoes of high solids content usually must be used. On the other hand, the flaked products prepared according to the patents set forth above are of good quality when reconstituted, but have a relatively low bulk density. This is particularly true where the potatoes originally have a low solids content. In the latter case, a maximum density of about 11 lbs. per cubic foot is often found. This has contributed to a preference for high solids content potatoes in the commercial practice of the processes of these patents.

Comminution or subdivision of the potato flakes increases the bulk density of the product, but in many instances results in reconstituted potatoes which have a starch-like consistency. This problem occurs, for the most part, with low solids content potatoes. This starch-like consistency is typical of dehydrated potatoes containing a relatively large amount of free starch liberated by rupture of the individual starch granules of the potatoes.

It has now been found that the above-described difficulties can be avoided and a high bulk density product of exceptionally fine quality can be obtained from low solids content potatoes by first comminuting the dehydrated potato flakes obtained according to the processes outlined in the three patents set forth above, removing the "fines," i.e., the very fine particle sized material, and returning these fines to a subsequent batch of mashed potatoes prior to drum-drying thereof. When this process is followed, the first batch of dehydrated product has a considerably higher bulk density than drum-dried materials prepared in a conventional manner, and at the same time, reconstitutes to a mashed potato product having non-starchy and acceptable consistency. The fines are not discarded, but are added to a subsequent batch. Although it would be expected that the fines would cause subsequent batches to be starchy when reconstituted, it was unexpectedly found that the quality of subsequent batches was at least equal to and in some instances superior to the dried product from which the fines had been removed.

It has been the applicant's experience that low solids content potatoes, in many instances, give flakes which reconstitute to a relatively non-mealy and sometimes starchy product especially when the solids content of the tubers is very low, e.g. 16–18%. When these same potatoes are supplemented with about 2 to 5% fines, the mash dried, the flakes reduced in size, and the fines removed, a marked reduction in starchiness in the reconstituted product is obtained. Still further advantages are that the drum-drying characteristics of the mash may be improved, potato flakes of slightly increased thicknses are obtained, and a higher bulk density product of acceptable consistency results.

"Fines" as defined herein and in the appended claims is meant to describe potato flakes or portions thereof which will pass through about a 6 mesh or smaller screen. These fines, if present in a substantial amount, cause the texture of the reconstituted potato flakes to be excessively pasty and starchy. It is recognized that larger size potato flakes can be added back to subsequent batches of mashed potatoes according to the process of this invention. Such a practice is not usually advantageous, however, as dehydrated potato flakes having a particle size of larger than about 6 mesh generally provide a product of acceptable mealiness and texture without further processing. On the other hand, particle sizes as fine as those found in potato flour may be added back to a subsequent batch of mashed potatoes according to the process of this invention, as shown in Example 5 below.

The amount of fines which are added to a subsequent batch of mashed potatoes according to the process of this invention is preferably between ½% and 5%, based on the weight of the wet mashed potatoes being dried. This amount, however, will vary according to several factors. In the first place, the amount of fines added back depends upon the solids content of the tubers undergoing processing. The lower the solids content of these tubers, the larger the amount of fines that should be added. In the second place, the amount of fines added back will depend on the total quantity of fines recovered after the flakes have been subdivided to the desired bulk density. It is understood, of course, that if only a very small amount of fines is recovered, it may be advisable to add either larger pieces of flake or more finely comminuted pieces of flake. In other words, if the dry solids concentration of the mash needs to be increased in order to improve the reconstituted quality of the flakes and the supply of fines desired from the process is insufficient, larger sized particles may, on occasion, be employed. In addition to the density consideration, the percentage of fines removed from a given batch of dried flakes will usually be the minimum amount required to provide a reconstituted product which has acceptable texture, and is of a non-starchy and non-pasty consistency. These factors are in turn related to the solids content of the raw potatoes employed in the process. Flakes from higher solids potatoes can usually have a larger percentage of fines than flakes from low solids tubers and still be reconstituted to mash with good texture. It has also been found that flakes prepared with added fines can sometimes have a larger percentage of fines than flakes prepared from the same tubers without added fines.

The process of this invention comprises generally the following steps. The raw potatoes having less than 20% solids are peeled and trimmed, after which an optional sulfiting step may be employed if the potatoes are to be held for any period of time prior to subsequent processing. The potatoes are then sliced, precooked in water at 155–160° F., and then further cooked in a steam chamber.

After cooking is complete, the product is riced to form a mashed potato, and various additives, such as sulfites, anti-oxidants, non-fat skim milk solids and the like are thoroughly mixed with the mash. The mashed potato is then drum-dried to yield a sheet approximately 0.005–0.008 inch thick. The dried sheet is broken into flakes, generally approximately ½″ x ½″, by any convenient means. Up to this point, the process is a conventional one and is substantially as the processes described in the three patents set forth above.

The drum-dried potato flakes obtained above are comminuted to increase their bulk density. A comminuting mill equipped with fixed blades and a punched hole or mesh screen with openings appropriately sized can be used for this purpose. The fines obtained after comminution are removed by screening the dried product over a suitably sized screen, preferably about 12 mesh. Those retained on the screen are employed as the final product. The fines passing through the screen are added back to a subsequent batch of mashed potatoes prepared as described above, uniformly mixed, and the batch is subjected to drum-drying.

The preferred particle size which characterize the products which have been found to be acceptable according to this invention range from a maximum which will just pass through a No. 3½ mesh screen to a minimum which will just be retained on a No. 20 mesh screen. However, acceptable products have been obtained where the minimum particle size is that which is just retained on a No. 28 mesh screen.

Although it is known to the art that flakes prepared from high solids potatoes (over about 20%) can usually be comminuted to a higher bulk density than flakes from low solids potatoes, it is sometimes advantageous to apply the technique as set forth above to high solids potatoes so as to increase even further the bulk density of flakes made therefrom. In such cases, it has been found desirable to add a suitable amount of water along with the fines to facilitate both mixing in of the fines and subsequent drum-drying of the mash.

In order to further illustrate the process of this invention reference is made to the following specific working examples.

Example 1

Maine Katahdin potatoes containing 19.3% solids were peeled by means of an abrasion peeler and the peeled tubers were trimmed by hand. The tubers were then cut into ⅝″ thick slices. These were heated in twice their volume of water for twenty minutes at 70° C. and then cooked in steam at atmospheric pressure for twenty minutes. The cooked product was riced by forcing it through a plate perforated with the maximum possible number of ¼″ diameter circular openings. The mash thus obtained was placed in the bowl of a Hobart mixer equipped with a paddle-type blade, and mixed at low speed for one minute with the following additives:

2.5 g. $NaHSO_3$ plus 7.5 g. of $Na_2SO_3$
   dissolved in 100 ml. water _____ 1 ml./lb. of mash.
Aqueous dispersion of 9 g. non-fat milk solids plus 9 g. distilled monoglyceride diluted to 100 ml. _____ 2 ml./lb. of mash.
Dispersion of 5 g. Tenox VI (anti-oxidant) in 200 ml. water _____ 3 ml./lb. of mash.

Tenox VI is an Eastman Kodak food grade antioxidant having the following composition:

| | Percent |
|---|---|
| Butylated hydroxyanisole | 10 |
| Butylated hydroxytoluene | 10 |
| Propyl gallate | 6 |
| Citric acid | 6 |
| Propylene glycol | 12 |
| Vegetable oil | 56 |

The mash was dried on a double drum drier (12″ diameter) operated at about 30 p.s.i.g. steam pressure, about 1 r.p.m. drum speed, and a clearance between the rolls of 0.01 inch. Only one drum of the two was supplied with steam, making the machine a single drum drier in effect.

The sheet obtained was irregular. It was broken up coarsely and further dried in an air drier to 3.3% moisture. It was then broken into irregular flakes about 1″ x 1″, some pieces smaller, some larger. The average thickness of these was 0.0062 inch.

The flakes (90 g.) were reconstituted by adding ½ cup of cold milk to 1½ cups of boiling water, adding the mixture to the flakes contained in a bowl, holding one minute, and whipping with a fork. The reconstituted mash was somewhat mealy in texture and only slightly starchy. It had a good flavor.

This example illustrates a typical process according to the patents cited above, as applied to low solids content potatoes.

Example 2

Mashed potatoes were prepared as described in Example 1, using potatoes from the same batch. While mixing the mash (21 lbs.), 0.4 lb. of flake from Example 1, broken to pass through a 5 mesh sieve, was added. The resultant product was then drum-dried as described in Example 1.

A thick, dense, uniform sheet was obtained off the drier. This was further dried in a current of air to a moisture content of 4.0%. The product obtained was broken into flakes as in Example 1. These were 0.0075 inch thick, on the average. On reconstitution in the manner described above, the thicker flakes gave a mash which was more mealy and less starchy in texture than that obtained in Example 1. The addition of potato flake fines to the mash increased the thickness and density of the flakes without adversely affecting their texture properties. In this instance, the texture was actually improved.

Example 3

This example demonstrates that progressively decreasing the size of flakes made in accordance with Example 1 results in a product that gives a pasty, nonmealy reconstituted mash. Surprisingly, however, this product returned to the process (Example 2) does not cause the production of flake with poor textural characteristics.

Dehydrated mashed potatoes were prepared as described in Example 1. The sheet off the drum drier was broken by hand to give a product, product A, consisting of 75% flakes too large to pass through a 3½ mesh sieve and the remainder smaller.

Product A was further broken and screened to give: Product B, all of which passed through a 3½ mesh sieve; product C, all of which was retained by a 3½ mesh sieve; product D, one-half of product B plus one-half of product C; and product E, all of which passed through a 6 mesh sieve.

On reconstitution, C gave the mealiest-tasting mash. Mash reconstituted from A was only slightly less mealy. That from D was rated poor in mealiness, being somewhat pasty, and that from B was rated slightly inferior to D with respect to mealiness and pastiness. The mash reconstituted from E showed only very slight mealiness; it was starchy and pasty in texture.

This test confirmed what was already known to the art, that increase in the pastiness and starchiness of the reconstituted mash accompanies decrease in flake size.

Example 4

This example illustrates that flakes can be reduced in size to a significant extent without adversely affecting the texture of mash derived therefrom provided the fines are removed. Reduction in flake size results in an increase in bulk density. Increasing bulk density in this manner results in the accumulation of fines which yield poor mash. These fines can be utilized as described in Example 2.

Dehydrated mashed potatoes were prepared according to the process of Example 1 from Maine Russet tubers containing 18.5% solids. The dried sheet of mash, 0.005 inch thick, when broken into pieces about ½" x ½" in surface dimensions, had a bulk density of 10 lbs./cu. ft. and reconstituted to a mash with somewhat mealy, non-starchy texture. When breaking was continued until the bulk density was 18 lbs./cu. ft., however, the mash obtained was definitely less mealy and slightly starchy-tasting.

Removal from the 18 lbs./cu. ft. product of the fraction passing through a 12 mesh sieve resulted in a decrease in bulk density to 16½ lbs./cu. ft., but the mash obtained from this product was equal in texture to that from the 10 lbs./cu. ft. material. Thus, an increase in bulk density of 65% was achieved.

Other experiments along the same lines demonstrated that depending on solids-content of the starting tuber, distribution of flake size, and other factors, comparable results could be obtained by removing only material passing through a 28 mesh sieve.

Example 5

This example illustrates that the use of the process of this invention is not limited by the size of the material returned to the process, provided, of course, that the amount added to a subsequent mash is not excessive.

Maine Russet potatoes containing about 19% solids were peeled, cooked and riced as described in Example 1. One-half of the mash was converted to flakes about ½" square as in Example 1; these served as control flakes. To the other half of the batch potato flour was added, 3% on a wet mash basis (approximately 15% on a potato solids basis), along with the other additives. The mash was drum-dried in the same way as the control mash, and the dried product was broken into flakes about ½" square.

The control and experimental products were reconstituted as in Example 1, side by side. The two reconstituted mashes were identical with respect to texture and flavor.

Example 6

The continued recycling of fines derived from flakes already containing fines might conceivably result in an unsatisfactory product. This is shown not to be the case in this example, wherein the process of this invention was used in the preparation of two successive batches of flakes.

Fines were prepared from a batch of Maine Russet potato flakes by grinding these flakes to pass through a 12 mesh sieve. A second batch of Russet potatoes was peeled, cooked and riced. The solids content of the mash obtained was raised from 20.5% to 23.0% by the addition of the fines. The mash was drum-dried as described in Example 1, with the additives listed therein. The flakes yielded reconstituted mashed potatoes with texture and flavor equal to that of mash made from flakes not containing recycled fines.

A third batch of Maine Russet potatoes, containing about 19% solids, was processed into 50 lbs. of cooked, riced mash. To 25 lbs. of this mash there was added 0.625 lb. of flake from the run just described, previously pulverized to pass through a 12 mesh sieve, along with the additives in Example 1. Only the Example 1 additives were added to the remaining 25 lbs. Both batches of mash were drum-dried and the sheets broken to about ½" square flakes. These flakes gave reconstituted products equal in texture and flavor quality.

When the third batch of flakes was broken to pass through a 3½ mesh sieve and material passing through a 12 mesh sieve was removed, the high bulk density product obtained yielded a reconstituted mash equal in texture and flavor to the mashes just noted.

The mesh size referred to herein and in the appended claims is in terms of United States standard screen and sieve sizes.

The terms "low solids content" and "high solids content" potatoes as used herein and in the appended claims conform generally in meaning to their usage in the art. "Low solids content" potatoes are those potatoes containing less than 20% solids, such as the Eastern Katahdins of the last few years. Tubers containing more than about 20% solids, on the other hand, are called "high solids content" potatoes.

Bulk density, as used in the specification and claims, was determined as follows: 100 grams of potato flakes were poured into a 500 ml. graduated cylinder of 2 inch diameter. The cylinder was dropped onto a pad 10 times from a height of 4 inches, and the volume then occupied by the flakes was noted.

The term "mealy," as used herein and in the appended claims, conforms in meaning to the definition found in Webster's New International Unabridged Dictionary: "having the qualities of, or like meal; soft, dry, and friable; as, *a mealy* potato."

It is understood that the foregoing examples are illustrative only and that modifications will occur to those skilled in the art. Therefore, the invention is not to be limited thereto but is to be defined by the appended claims.

I claim:

1. In a process of preparing a dehydrated potato product including the steps of cooking raw potatoes, mashing the cooked potato, and drying the mashed potato by applying a film thereof to a heated surface, the improvement comprising subdividing the dried potato thus obtained to increase its bulk density, separating from the subdivided dried potato the fines having a maximum particle size which will just pass through a 6 mesh screen and adding at least part of the fines to a subsequent batch of mashed potato prior to drying thereof, the fines being added in an amount of from about .5% to about 5% based on the weight of the mashed potato prior to drying.

2. In a process of preparing a dehydrated potato product from low solids content potatoes including the steps of cooking the raw potato, mashing the cooked potato, and drying the mashed potato by applying a film thereof to a heated surface, the improvement comprising subdividing the dried potato thus obtained to increase its bulk density, screening the subdivided dried product to remove a fraction passing through a 28 mesh sieve, and adding the separated fraction to a subsequent batch of mashed potato before drying thereof, the fines being added in an amount of from about .5% to about 5% based on the weight of the mashed potato prior to drying.

3. In a process of preparing a dehydrated potato product from low solids content potatoes including the steps of cooking the raw potatoes, mashing the cooked potato, drying the mashed potato by applying a film thereof to a heated surface and recovering the dried potato in flake form, the improvement comprising comminuting the dried potato to provide a product having a particle size distribution such that substantially all of the product will pass through a 3½ mesh screen, from about 75% to about 95% will be retained on a 28 mesh screen and the remainder will pass through the 28 mesh screen, and adding the material passing through the 28 mesh screen to a subsequent batch of mashed potatoes prior to drying thereof, the fines being added in an amount of from about .5% to about 5% based on the weight of the mashed potato prior to drying.

4. A process of increasing the bulk density of drum-dried mashed potatoes comprising comminuting the dried potatoes so that substantially all of the product passes a 3½ mesh screen, separating the comminuted dried potatoes into a coarse and fine fraction, said coarse fraction being retained on a 28 mesh screen, and adding the fine fraction to a subsequent batch of mashed potatoes prior to drying thereof, the fines being added in an amount of from about .5% to about 5% based on the weight of the mashed potato prior to drying.

5. A process of preparing high bulk density dehydrated potatoes of good quality from raw potatoes having a total solids content below 20%, comprising peeling and trimming the potatoes, slicing the potatoes, partially cooking the slices in water at from about 140 to 180° F., further cooking the slices in atmospheric steam, mashing the cooked product, drum-drying the mash to obtain a dried sheet ranging from about 0.005 to 0.008 inch in thickness, comminuting the dried product so that substantially all of the product will pass through a 3½ mesh screen and from about 75% to about 95% will be retained on a 20 mesh screen, and adding the material passing through the 20 mesh screen to a subsequent batch of mashed potatoes prior to drying thereof, the fines being added in an amount of from about .5% to about 5% based on the weight of the mashed potato prior to drying.

6. The process of claim 5 wherein said subsequent batch of mashed potatoes is drum-dried to obtain a dried sheet ranging from about 0.005 to 0.008 inch in thickness, the dried product is comminuted so that substantially all of the product passes a 3½ mesh screen and from about 75% to about 95% thereof is retained on a 20 mesh screen.

7. In a process of preparing a dehydrated potato product from low solids content potatoes including the steps of cooking the raw potatoes, mashing the cooked potato, drying the mashed potato by applying a film thereof to a heated surface and recovering the dried potato in flake form, the improvement comprising comminuting the dried potato to provide a product having a particle size distribution such that substantially all of the product will pass through a 3½ mesh screen, from about 75% to about 95% will be retained on a 20 mesh screen and the remainder will pass through the 20 mesh screen, and adding the material passing through the 20 mesh screen to a subsequent batch of mashed potatoes prior to drying thereof, the fines being added in an amount of from about .5% to about 5% based on the weight of the mashed potato prior to drying.

8. A process of increasing the bulk density of drum-dried mashed potatoes comprising comminuting the dried potatoes so that substantially all of the product passes a 3½ mesh screen, separating the comminuted dried potatoes into a coarse and fine fraction, said coarse fraction being retained on a 20 mesh screen, and adding the fine fraction to a subsequent batch of mashed potatoes prior to drying thereof, the fines being added in an amount of from about .5% to about 5% based on the weight of the mashed potato prior to drying.

9. A process of preparing high bulk density dehydrated mashed potatoes of good quality from raw potatoes having a total solids content below about 20%, comprising peeling and trimming raw potatoes, cooking the potatoes, mashing the cooked potatoes, adding to the mashed potatoes an amount of dehydrated potato particles having a maximum particle size which will pass through a 6 mesh screen sufficient to increase the solids content of the mash to from about 20% to about 25%, drying the mashed potato by applying a film thereof to a heated surface, recovering the dried potato in flake form, subdividing the dried flakes to provide a product having a particle size distribution such that substantially all of the dried product will pass through a 3½ mesh screen and will be retained on a 28 mesh screen.

10. A process of preparing high bulk density dehydrated mashed potatoes of good quality from raw potatoes having a total solids content below about 20%, comprising peeling and trimming raw potatoes, cooking the potatoes, mashing the cooked potatoes, adding potato flour to the mashed potatoes to increase the solids content of the mash to from about 20% to about 25%, drying the mashed potato by applying a film thereof to a heated surface, recovering the dried potato in flake form, subdividing the dried flakes to provide a product having a particle size distribution such that substantially all of the dried product will pass through a 3½ mesh screen and will be retained on a 28 mesh screen.

References Cited in the file of this patent

UNITED STATES PATENTS

| | | |
|---|---|---|
| 2,630,391 | Templeton | Mar. 3, 1953 |
| 2,759,832 | Cording et al. | Aug. 21, 1956 |
| 2,780,552 | Willard | Feb. 5, 1957 |
| 2,787,553 | Cording | Apr. 2, 1957 |

OTHER REFERENCES

"Advances in Food Research," vol. 6, 1955, pp. 238–239.

"Potato Flakes, A New Form of Dehydrated Mashed Potatoes, I, Pilot Plant Process Using Double Drum Drier, U.S.D.A. Agricultural Research Service, ARS–73–2, Nov. 15, 1954, pp. 1 to 4 (99–207).